United States Patent

[11] 3,582,164

[72] Inventors William J. Derner
Manilus;
Thomas L. Morrissey, Syracuse, both of, N.Y.
[21] Appl. No. 831,483
[22] Filed June 9, 1969
[45] Patented June 1, 1971
[73] Assignee Rollway Bearing Company, Inc.
Syracuse, N.Y.

[54] POWDERED METAL BEARING CAGE
2 Claims, 4 Drawing Figs.
[52] U.S. Cl. .................................................. 308/201, 308/217
[51] Int. Cl. .................................................. F16c 33/38, F16c 33/44
[50] Field of Search .................................................. 308/201, 212; 29/148.4

[56] References Cited
UNITED STATES PATENTS
| | | | |
|---|---|---|---|
| 1,415,420 | 5/1922 | Weibull | 308/217 |
| 3,362,762 | 1/1968 | Haller | 308/217 |
| 3,057,667 | 2/1960 | Gothberg et al. | 308/217 |

Primary Examiner—Martin P. Schwadron
Assistant Examiner—Frank Susko
Attorney—John R. Varney ABSTRACT: A cage for the rolling elements of a bearing, made entirely of powdered metal or made of powdered metal segments and stamped or cast steel end rings, with segments having contact with the rolling elements on the radius of the cage intersecting the centerline of each rolling element, and each end ring having oil grooves on its surface facing the race flange and oil pads in the end rings at points contacting the rolling elements.

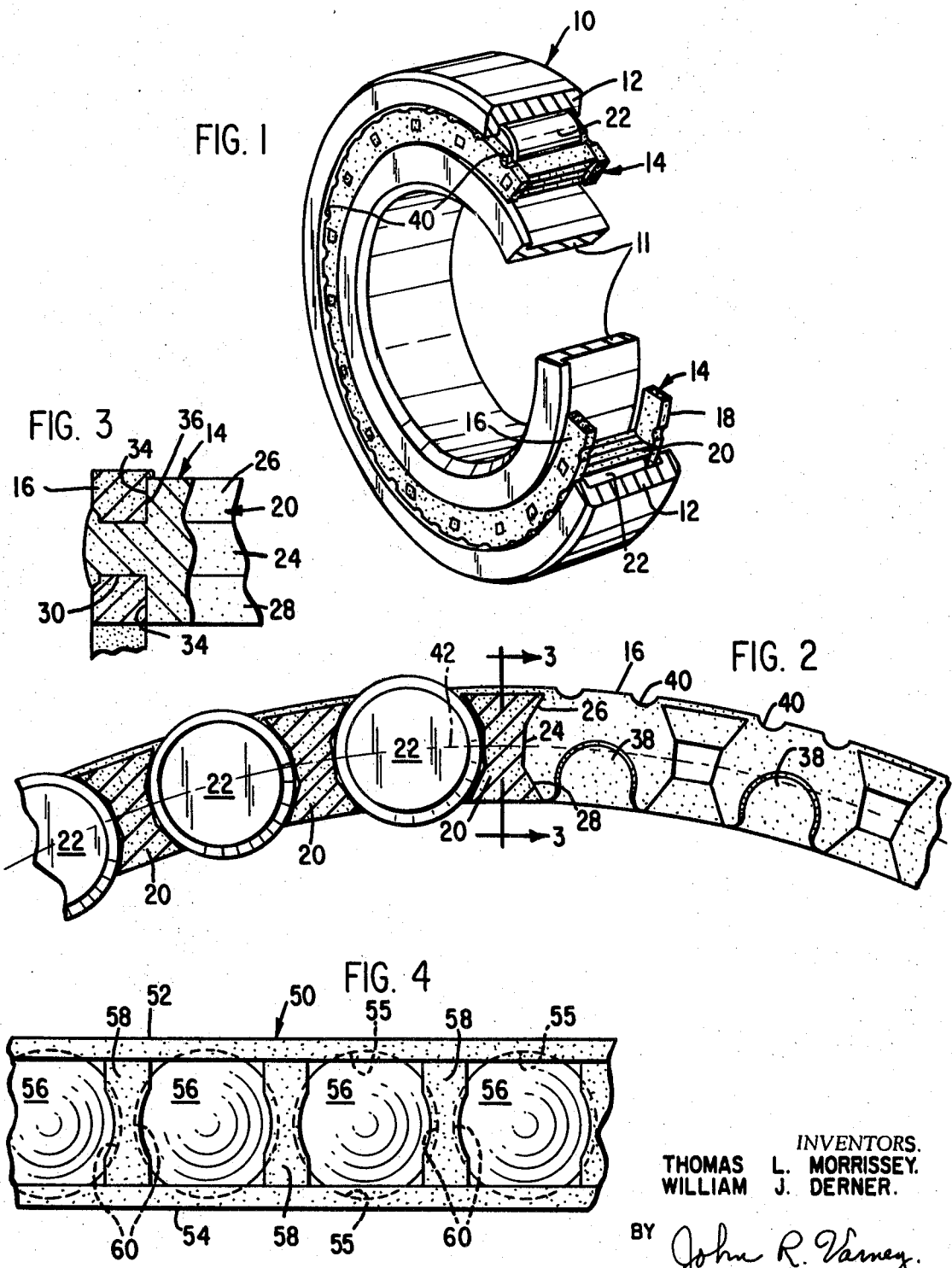

POWDERED METAL BEARING CAGE

BACKGROUND OF INVENTION

In ball and roller type bearings made heretofore the cages provided therewith were made of sheet metal stamped and coined to shape and lacked the very close tolerances needed for smooth running at high speeds. The segments between each rolling element were poorly fitted and contacted the rolling elements with circular contacts or angular flat surfaces which cause a slight wedging effect raising the operating temperature thereof.

Bearings running at higher temperature required more lubrication and limited maximum speed in order to have a bearing of extended life. Lubricating slots were required on roller ends to insure lubrication thereof, and maintain a reasonable operating temperature. These slots increased bearing cost and emitted noise therefrom.

DESCRIPTION OF DRAWINGS

FIG. 1 is a perspective view of a roller bearing illustrating the bearing cage of this invention;

FIG. 2 is a fragmentary cross-sectional view of the cage member;

FIG. 3 is a view taken along lines 3-3 of FIG. 2;

FIG. 4 is a fragmentary cross-sectional view of a modified embodiment illustrating a ball bearing cage.

DESCRIPTION OF THE PREFERRED EMBODIMENT

There is shown in FIG. 1 a roller bearing 10 having an inner and outer race 11—12 enclosing a roller cage 14. The cage 14 is made of two sides or end rings 16—18 and a series of spacer bars or segments 20. Interposed between each adjacent pair of segments 20 is a roller element 22 which is in rolling contact with the faces of races 11-12 and its adjoining segments 20. The segments 20 as shown in FIG. 2 may be divided into three trapezoidal-shaped sections, namely intermediate or center section 24, outer section 26 and inner section 28. Center section 24 of segment 20 extends beyond sections 26—28 on each end forming a trapezoidal-shaped trunnion 30 which fits into a mating aperture in each end ring 16 and 18 and having its end projecting through the end ring upset or staked over as more clearly shown in FIG. 3. The faces 34 of sections 26 and 28 from which trunnion 30 projects are received in spot faces or recesser 36 in each end ring 16—18. The mating of faces 34 with recesses 36 provides a firm base and, along with the trunnion 30 securely staked over, prevents the segments from becoming skewed out of perpendicularity with the end rings 16—18. The combination of the recess 36 with the trapezoidal shaped trunnion, whose faces provide perpendicular contact with the rolling element forces, provides the ability to withstand larger than average shear forces which are applied to the trunnion end ring junction by the rolling element.

As shown in FIG. 2 the roller elements 22 come into contact with the segments 20, and more particularly the center section 24, on the cage radius shown by dotted line 42, which radius intersects the center line of each roller element 22. This radius-centerline contact keeps the roller elements 22 parallel and thus prevents a wedging action among the roller elements.

Centering on the end of each roller element on the end ring there is a semicircular recess 38, which when under operating conditions floods with lubricant and keeps the end surfaces of the rollers lubricated and free rolling. On the circumference of each end ring 16—18 there are recesses 40 which allow the lubricant to reach the rollers and decreases the length of possible surface contact with the race 12. The end rings may be recessed on both the inside and outside diameters or just on the outside diameter as shown in FIGS. 1 and 2.

In FIG. 4 there is shown a ball bearing type bearing 50 with the inner and outer races removed. Bearing 50 comprises end rings 52—54 similar to end rings 16—18 in FIG. 1—3 with the exception they have spherical depressions 55 in which rest balls or rolling elements 56. Interposed between the balls 56 are segments 58 secured into the end rings 52—54 in the same way as the segments 20 are fixed in end rings 16—18. On each side of segments 58 there are spherical depressions 60 which closely fit the rolling elements 56, holding them in place freely enough so as to allow them to rotate as the races revolve.

The end rings 16—18—52—54 and segments 20—58 are made from powdered metal compacted and sintered to an average density of 6.7 to 7.0 grams per cubic centimeter or greater. Parts made from powdered metals have microscopic pores that fill with lubricant when lubricant is applied to the bearings. These pores with lubricant in them provide an inherent low friction surface which allows the bearing to be run at twice the speeds of bearings of prior art. If for some reason the bearing becomes dry or lacks lubricant the temperature of the bearing will rise and the pores of the powdered metal parts would release an additional amount of the lubricant trapped therein extending greatly the time a bearing may run dry.

While a preferred embodiment of the invention has been described and illustrated, it should be understood that the invention is not limited thereto but may be otherwise embodied within the scope of the following claims.

We claim:

1. A cage for guiding the rolling elements of an antifriction bearing, the combination of a pair of end rings having evenly spaced recesses each coinciding with a preformed aperture, a plurality of spacer bars having end projections closely received in said end ring apertures, said spacer bar end projections being rigidly secured to said end rings, said recesses closely receiving said bars, said bars being shaped to closely enclose the rolling elements and making line contact therewith on the locus of a radius of the cage which passes through the center of each rolling element, said end rings and spacer bars being made of powdered metal compacted to an average density of from 6.7 to 7.0 grams per cubic centimeter.

2. A cage as defined in claim 1 wherein each of said spacer bars in cross section is in the form of a central, an inner and an outer trapezoidal section with the shorter of the parallel sides of the inner and outer sections being respectively colinear with the parallel sides of the central section, the rolling elements making contact with the central section of the spacer bar on each side thereof.